(12) United States Patent
Wright

(10) Patent No.: US 10,738,852 B1
(45) Date of Patent: Aug. 11, 2020

(54) LAMINATED BEARING ASSEMBLY WITH DIFFERING SHIM THICKNESSES

(71) Applicant: Aktiebolaget SKF, Gothenburg (SE)

(72) Inventor: Derek Wright, Hampshire, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/369,167

(22) Filed: Mar. 29, 2019

(51) Int. Cl.
| | |
|---|---|
| *F16C 27/00* | (2006.01) |
| *F16F 1/40* | (2006.01) |
| *F16C 35/07* | (2006.01) |
| *F16C 23/08* | (2006.01) |
| *F16C 33/00* | (2006.01) |
| *F16C 35/073* | (2006.01) |
| *F16F 1/387* | (2006.01) |
| *B64C 27/35* | (2006.01) |
| *F16F 1/371* | (2006.01) |

(52) U.S. Cl.
CPC ............... *F16F 1/40* (2013.01); *B64C 27/35* (2013.01); *F16C 23/084* (2013.01); *F16C 27/00* (2013.01); *F16C 33/00* (2013.01); *F16C 35/073* (2013.01); *F16F 1/3713* (2013.01); *F16F 1/387* (2013.01)

(58) Field of Classification Search
CPC .... F16C 11/083; F16C 23/045; F16C 23/084; F16C 27/00; F16C 27/063; F16C 33/00; F16C 35/073; F16X 35/073; F16F 1/40; F16F 1/406; F16F 1/3713; F16F 3/087; F16F 3/0935; F16F 1/387; B64C 25/35; B64C 27/35

USPC ....... 384/129, 145, 148, 203, 220–221, 582; 267/140.2, 140.4, 141.1, 282; 403/132, 403/137; 428/174, 180, 213; 464/70
See application file for complete search history.

(56) References Cited

U.S. PATENT DOCUMENTS

| | | | | |
|---|---|---|---|---|
| 3,282,350 | A * | 11/1966 | Kisovec | ................. B64C 27/35 416/106 |
| 3,494,814 | A * | 2/1970 | Boggs | ...................... F16B 7/04 156/294 |

(Continued)

FOREIGN PATENT DOCUMENTS

| | | | | |
|---|---|---|---|---|
| EP | 0055660 A1 * | 7/1982 | ............. | B64C 27/35 |
| EP | 0162773 B1 * | 7/1988 | ............ | B64C 27/605 |
| WO | WO-2014160242 A1 * | 1/2014 | ............. | B32B 25/02 |

*Primary Examiner* — Marcus Charles
(74) *Attorney, Agent, or Firm* — J-TEK Law PLLC; Scott T. Wakeman; Mark A. Ussai

(57) ABSTRACT

A bearing assembly is for movably coupling first and second members and includes first and second laminated bodies disposed within the second member bore, spaced about a centerline and connected with the first member. The first laminated is formed of alternating, arcuate first elastomeric laminae and arcuate first rigid laminae nested generally about a first central axis, each first rigid lamina having a first radial thickness between inner and outer surfaces. The second laminated body is formed of alternating, arcuate second elastomeric laminae and arcuate second rigid laminae nested generally about a second central axis, each second rigid lamina having a second radial thickness between the rigid lamina inner and outer surfaces. The first radial thickness of the first rigid laminae is substantially greater than the second radial thickness of the second rigid laminae such that the second laminated body has a substantially lesser stiffness than the first laminated body.

17 Claims, 10 Drawing Sheets

(56) References Cited

U.S. PATENT DOCUMENTS

| | | | | |
|---|---|---|---|---|
| 3,787,102 | A * | 1/1974 | Moran | F16F 1/38 |
| | | | | 384/221 |
| 5,092,738 | A * | 3/1992 | Byrnes | B64C 27/51 |
| | | | | 416/134 A |
| 5,186,686 | A * | 2/1993 | Staples | B64C 27/35 |
| | | | | 464/69 |
| 5,248,361 | A * | 9/1993 | Paquet | B32B 25/10 |
| | | | | 156/171 |
| 5,460,487 | A * | 10/1995 | Schmaling | B64C 27/35 |
| | | | | 267/140.2 |
| 5,601,408 | A * | 2/1997 | Hunter | B64C 27/35 |
| | | | | 267/141.1 |
| 6,726,394 | B2 * | 4/2004 | Garnier | B61F 5/24 |
| | | | | 403/132 |
| 6,848,886 | B2 * | 2/2005 | Schmaling | B64C 27/35 |
| | | | | 416/134 A |
| 7,896,747 | B2 * | 3/2011 | Russell | F16F 1/387 |
| | | | | 464/70 |
| 8,911,153 | B2 * | 12/2014 | Cunningham | B64C 27/35 |
| | | | | 384/221 |
| 9,334,048 | B2 * | 5/2016 | Burnett | F16F 1/41 |
| 9,644,697 | B2 * | 5/2017 | Mitsch | F16F 1/3863 |
| 9,896,198 | B2 * | 2/2018 | Davis | B64C 27/35 |
| 2016/0238069 | A1 * | 8/2016 | Bohm | F16C 23/045 |
| 2019/0032741 | A1 * | 1/2019 | George | F16F 1/373 |

* cited by examiner

LAMINATED BEARING ASSEMBLY WITH DIFFERING SHIM THICKNESSES

BACKGROUND OF THE INVENTION

The present invention relates to bearings, and more particularly to laminated elastomeric bearings used in applications such as helicopter rotors.

Laminated elastomeric bearings are known and include a plurality of alternating, nested elastomeric and metallic layers disposed generally coaxially about a centerline. Such bearings permit movement of a component, such as a centering pin of a feathering hinge, to pivot or "twist" about the bearing centerline and/or to pivot partially about one or more axes generally perpendicular to the centerline. Such bearings are effective in applications such as supporting twisting of a tail rotor shaft or the feathering hinge of a rotor assembly, but may experience premature failure of the elastomeric layers in certain sections of the bearing which experience relatively greater amounts of tensile loading.

SUMMARY OF THE INVENTION

In one aspect, the present invention is a bearing assembly for movably coupling a first member with a second member, the second member having a bore with a centerline. The bearing assembly comprises a first, generally arcuate laminated body disposed within the outer member bore and having an inner radial end connectable with the first member and an outer radial end connectable with the second member. The first laminated body is formed of a plurality of alternating, generally arcuate first elastomeric laminae and generally arcuate first rigid laminae nested generally about a first central axis. Each one of the first elastomeric laminae and the first rigid laminae have opposing first and second arcuate ends and inner and outer circumferential surfaces extending circumferentially between the first and second arcuate ends. Each first rigid lamina has a first radial thickness between the rigid lamina inner and outer surfaces. Further, a second, generally arcuate laminated body is disposed within the second member bore so as to be spaced circumferentially about the centerline from the first laminated body. The second laminated body has an inner radial end connectable with the first member and an outer radial end connectable with the second member. The second laminated body is formed of a plurality of alternating, generally arcuate second elastomeric laminae and generally arcuate second rigid laminae nested generally about a second central axis. Each one of the second elastomeric laminae and the second rigid laminae have opposing first and second arcuate ends and inner and outer circumferential surfaces extending circumferentially between the first and second arcuate ends. Each second rigid lamina has a second radial thickness between the rigid lamina inner and outer surfaces. The first radial thickness of each one of at least a majority of the first rigid laminae is substantially greater than the second radial thickness of each one of at least a majority of the second rigid laminae such that the second laminated body has a substantially lesser stiffness than the first laminated body.

In another aspect, the present invention is a mechanical assembly comprising a shaft connectable with a mechanism, an elongated connecting rod having a longitudinal axis, two opposing ends spaced apart along the axis and at least one bore formed adjacent to one of the two rod ends and a bearing assembly for movably coupling the shaft with the rod. The bearing assembly includes a central coupler, which is disposed within the rod bore and has a central bore, the shaft being at least partially disposed within the coupler bore, and an outer circumferential surface, and first and second laminated bearing bodies as described in the preceding paragraph each disposed within the connecting rod bore and attached to the coupler and the rod.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
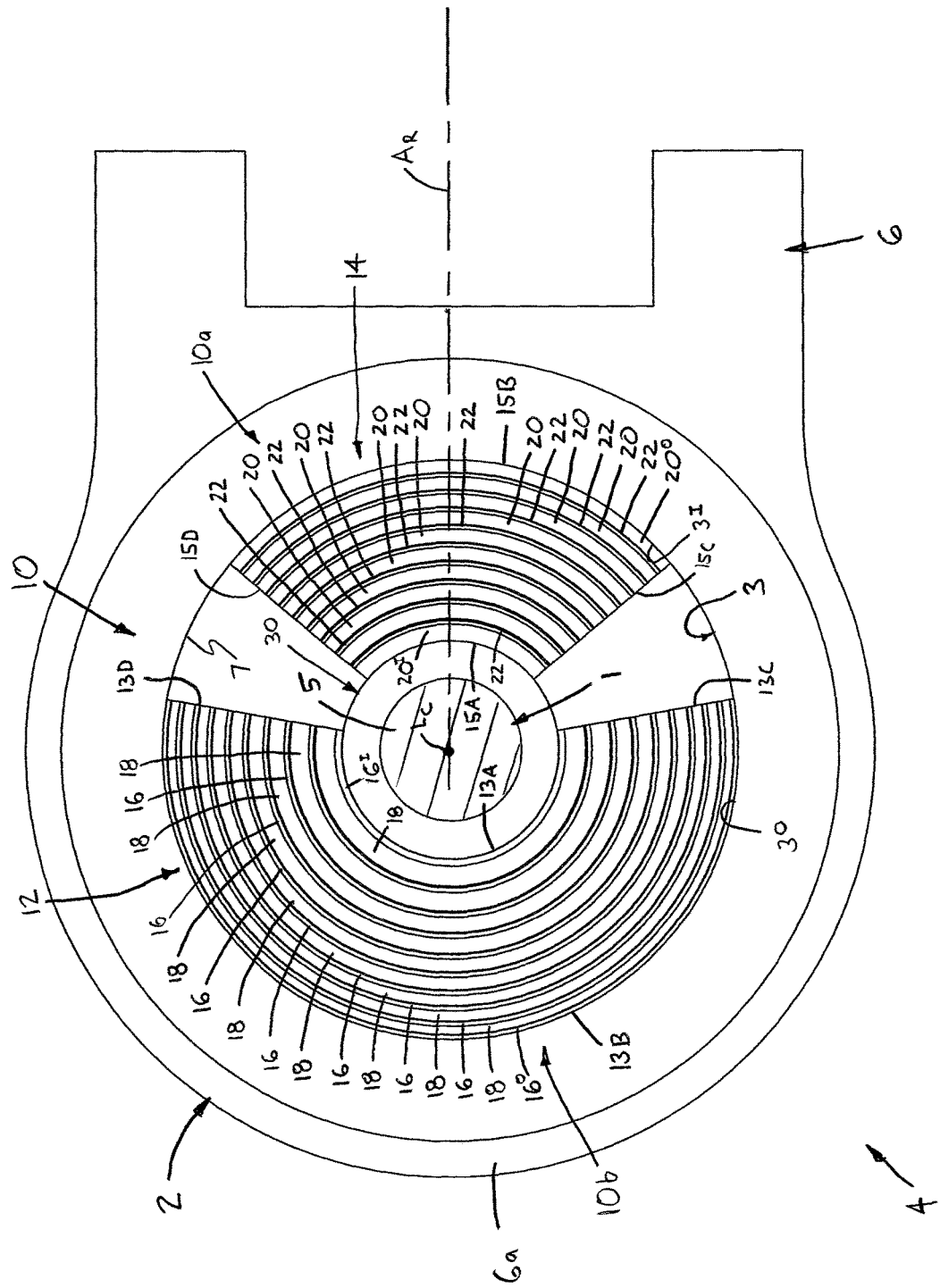
FIG. 1 is a top plan view of a laminated bearing assembly in accordance with the present invention, shown movably coupling first and second members.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-10 a laminated bearing assembly 10 for movably coupling a first member 1 and a second member 2, the second member 2 having at least one bore 3 with a centerline $L_C$. Preferably, the first and second members 1, 2 are components of a helicopter rotor drive assembly 4, specifically a drive shaft or pin 5 connectable with a mechanism and an elongated connecting rod 6. The connecting rod 6 has a longitudinal axis $A_R$, two opposing ends 6a, 6b (FIG. 10) spaced apart along the axis $A_R$ and two bores 3 each located adjacent to a separate one of the rods ends 6a, 6b.

However, the first and second members 1, 2 may be any other appropriate, relatively moveable components capable of being coupled through a laminated bearing assembly 10 as described below. In any case, the bearing assembly 10 basically comprises a first, generally arcuate laminated body 12 disposed within the second member bore 3 and a second, generally arcuate laminated body 14 disposed within the bore 3 so as to be spaced circumferentially about the centerline $L_C$ from the first laminated body 12. Each one of the first and second laminated bodies 12, 14 is configured to deflect, e.g., twist about the centerline $L_C$ or "cock" about axes (none indicated) perpendicular to the centerline $L_C$, when one of the first and second members 1 or 2 displaces relative to the other one of the first and second members 1, 2.

Figure 2:
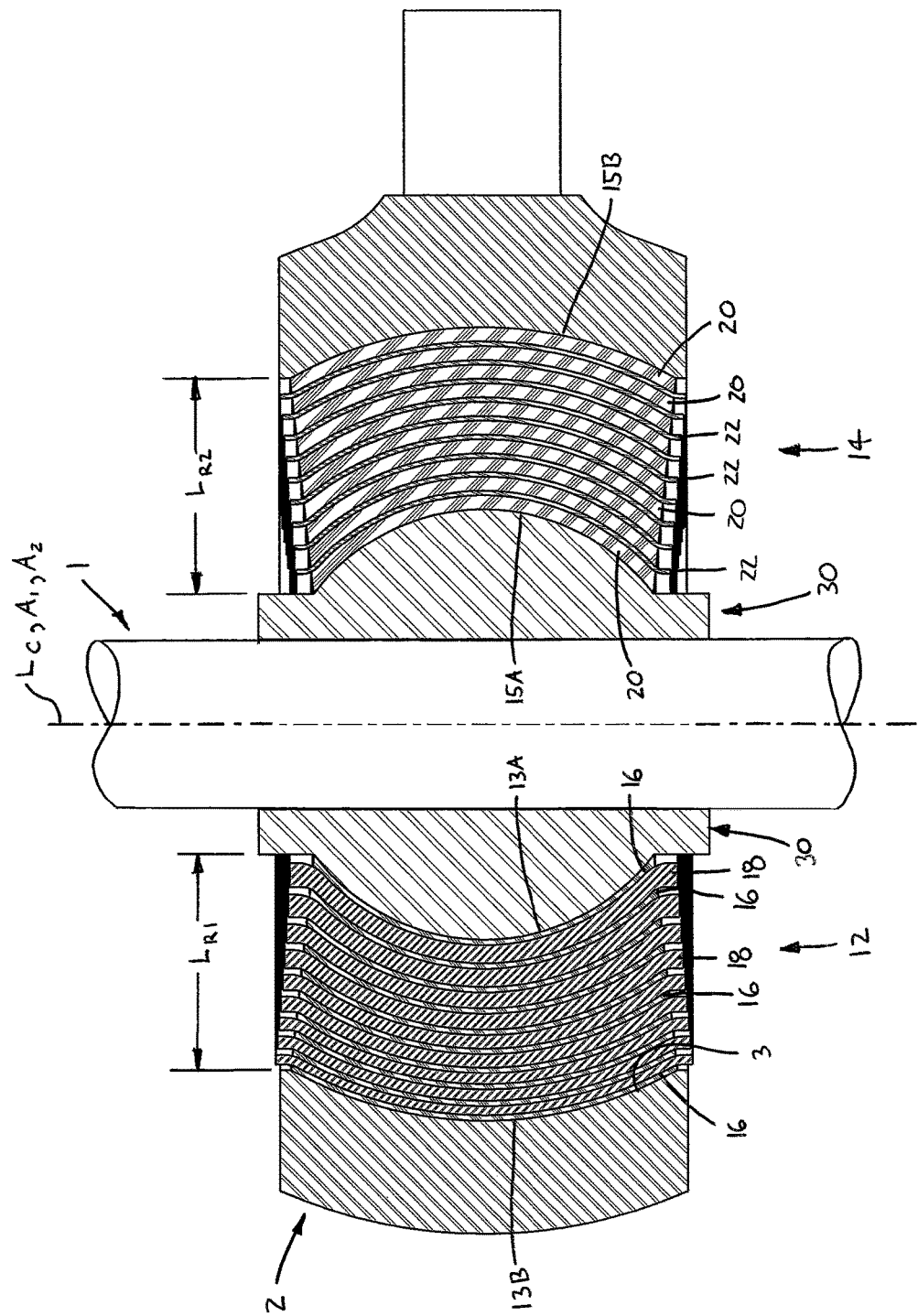
FIG. 2 is an axial cross-sectional view of the bearing assembly of FIG. 1.
Figure 3:
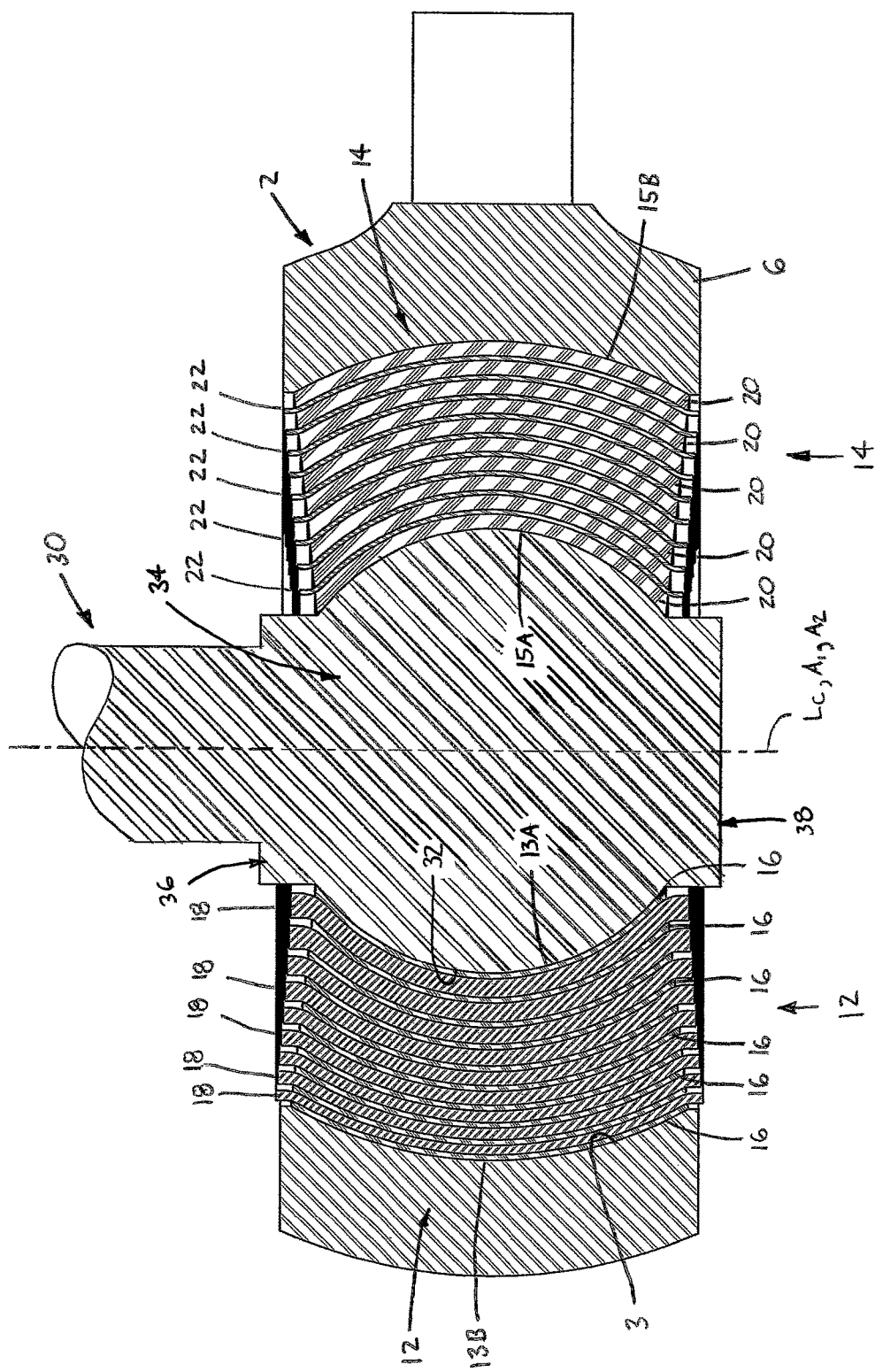
FIG. 3 is an axial cross-sectional view of the bearing assembly, shown with an alternative coupler.
Figure 4:
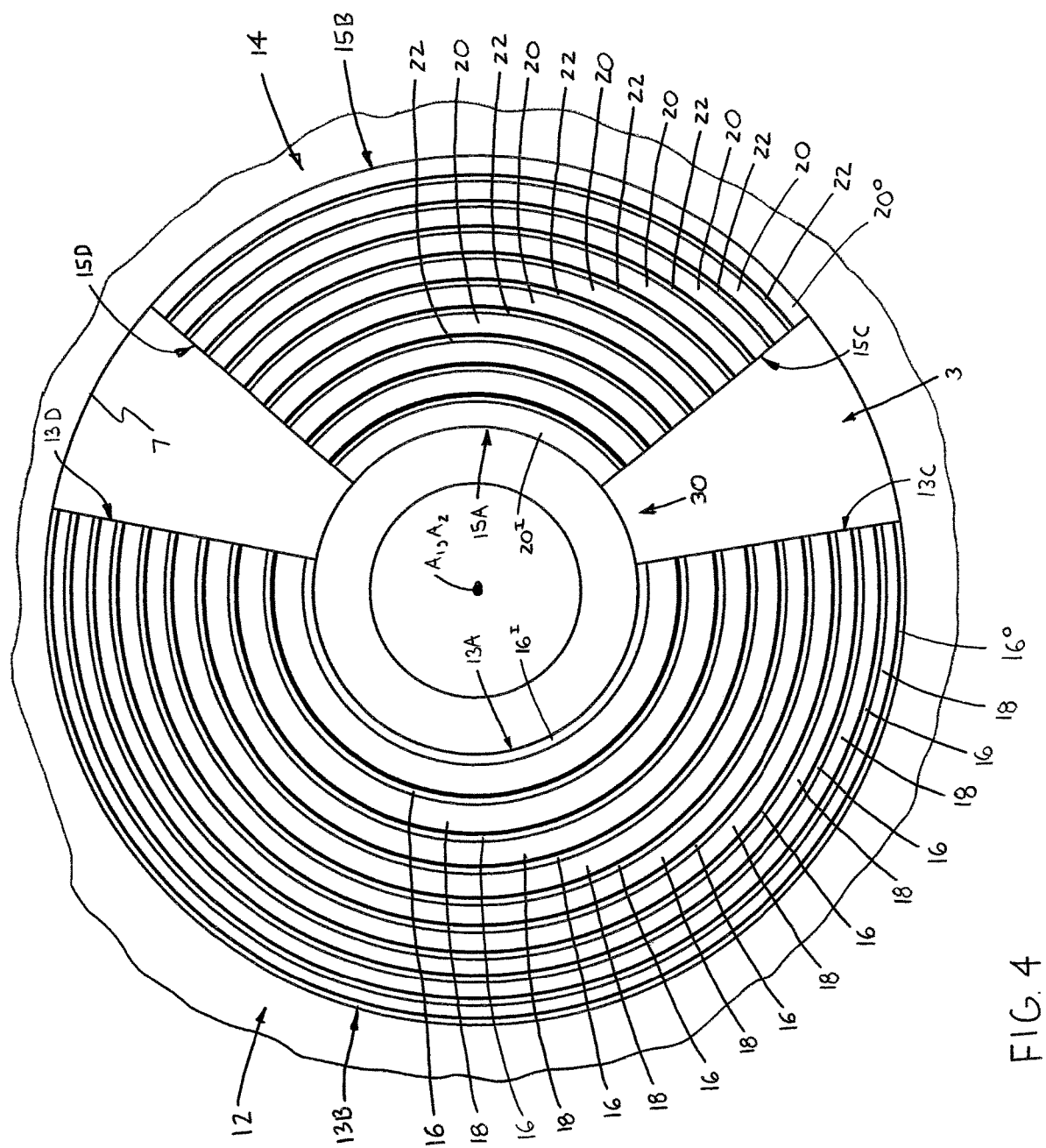
FIG. 4 is a broken-away, top plan view of the bearing assembly, shown without the first member.
Figure 5:
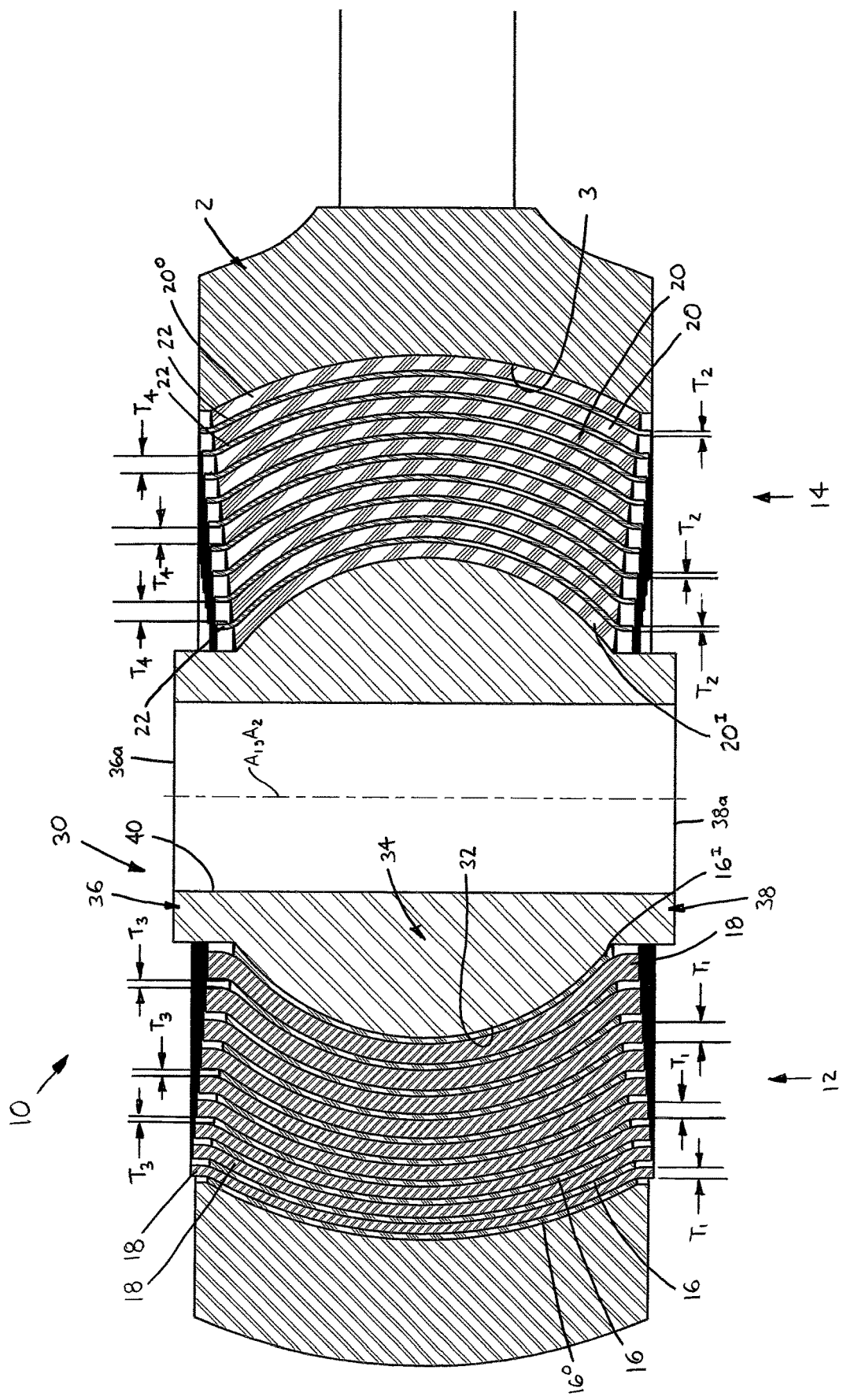
FIG. 5 is an axial cross-sectional view of FIG. 4.
Figure 6:
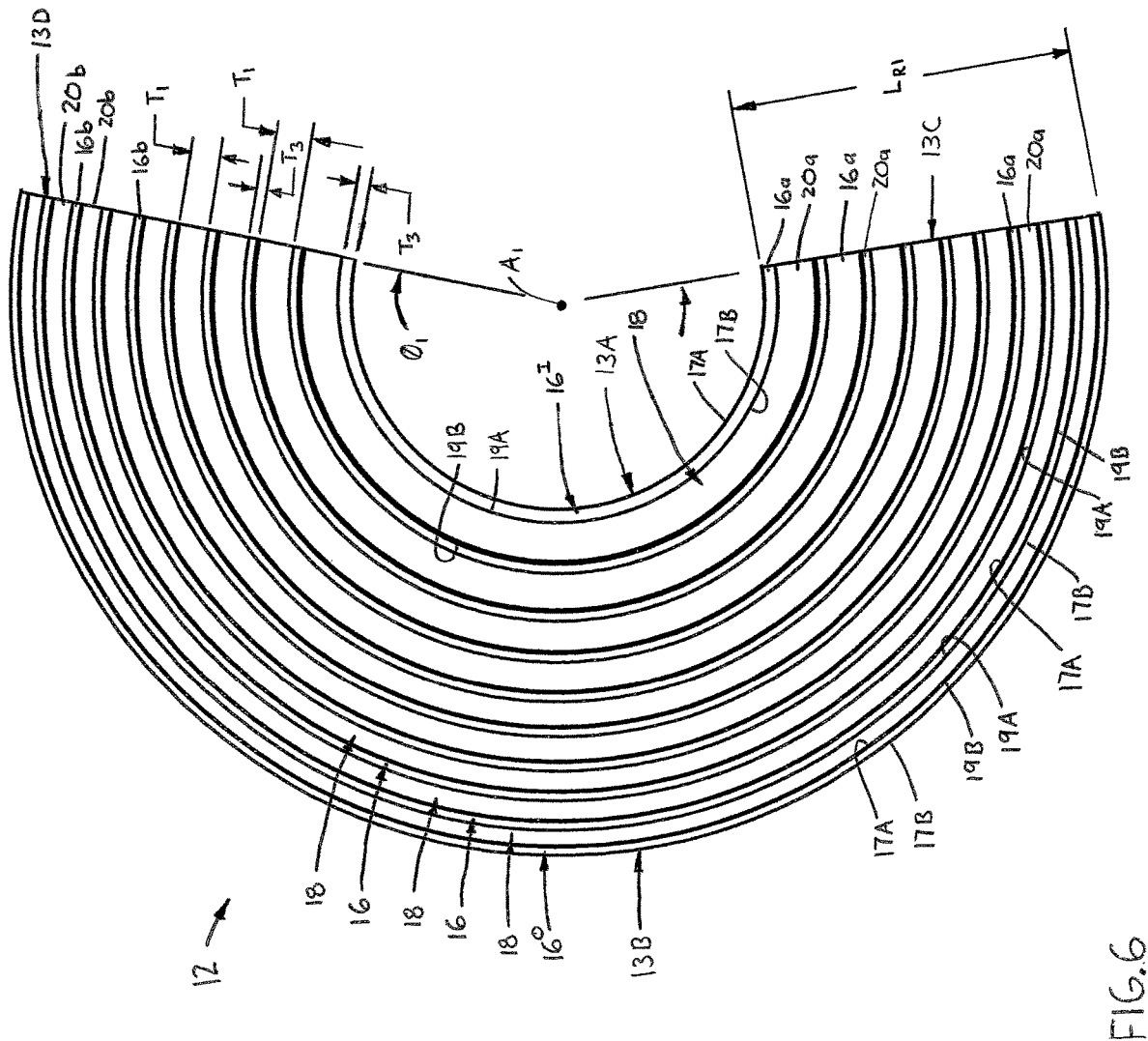
FIG. 6 is a top plan view of a first laminated bearing body.
Figure 7:
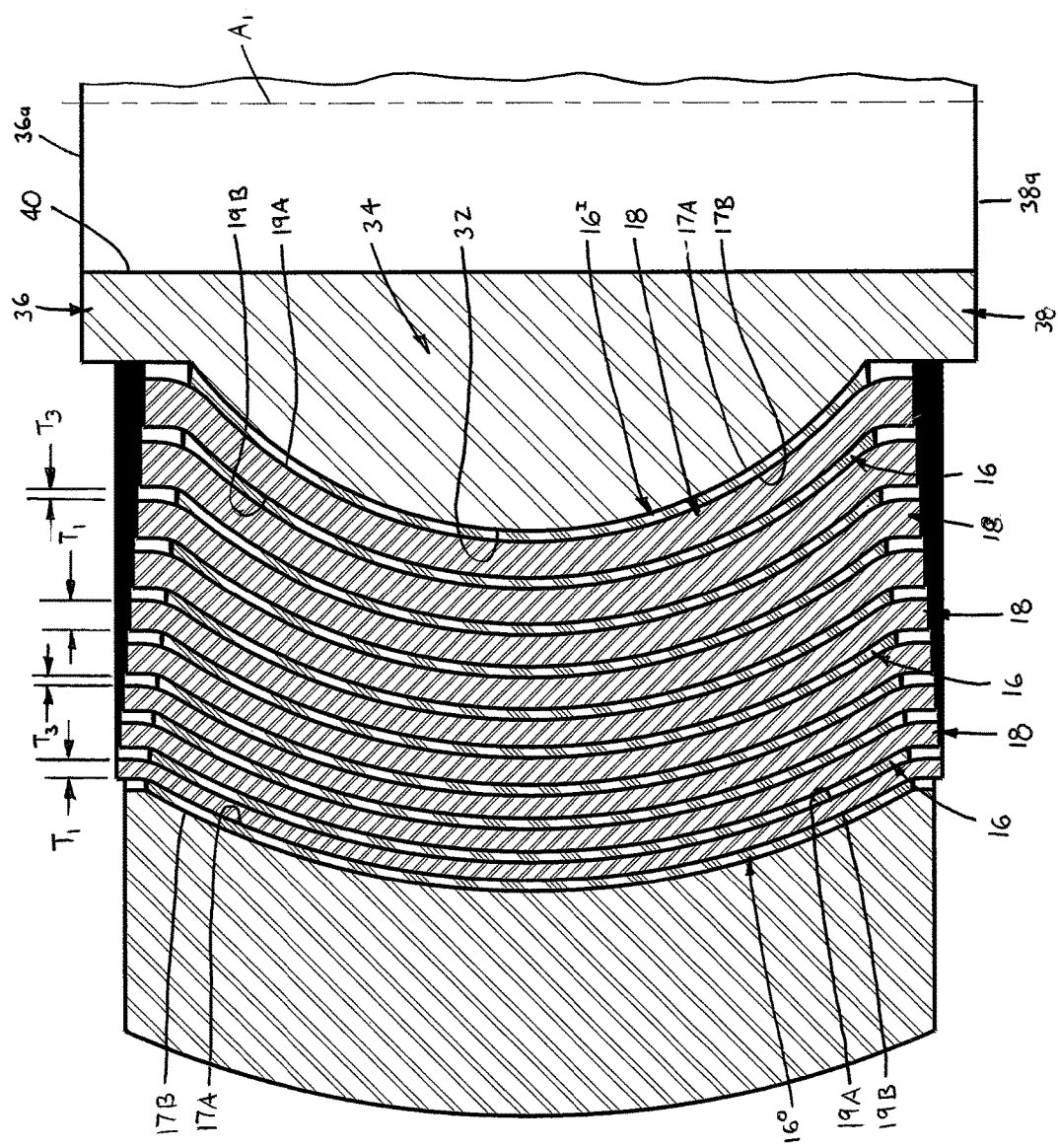
FIG. 7 is an axial cross-sectional view of the first laminated body.
Figure 8:
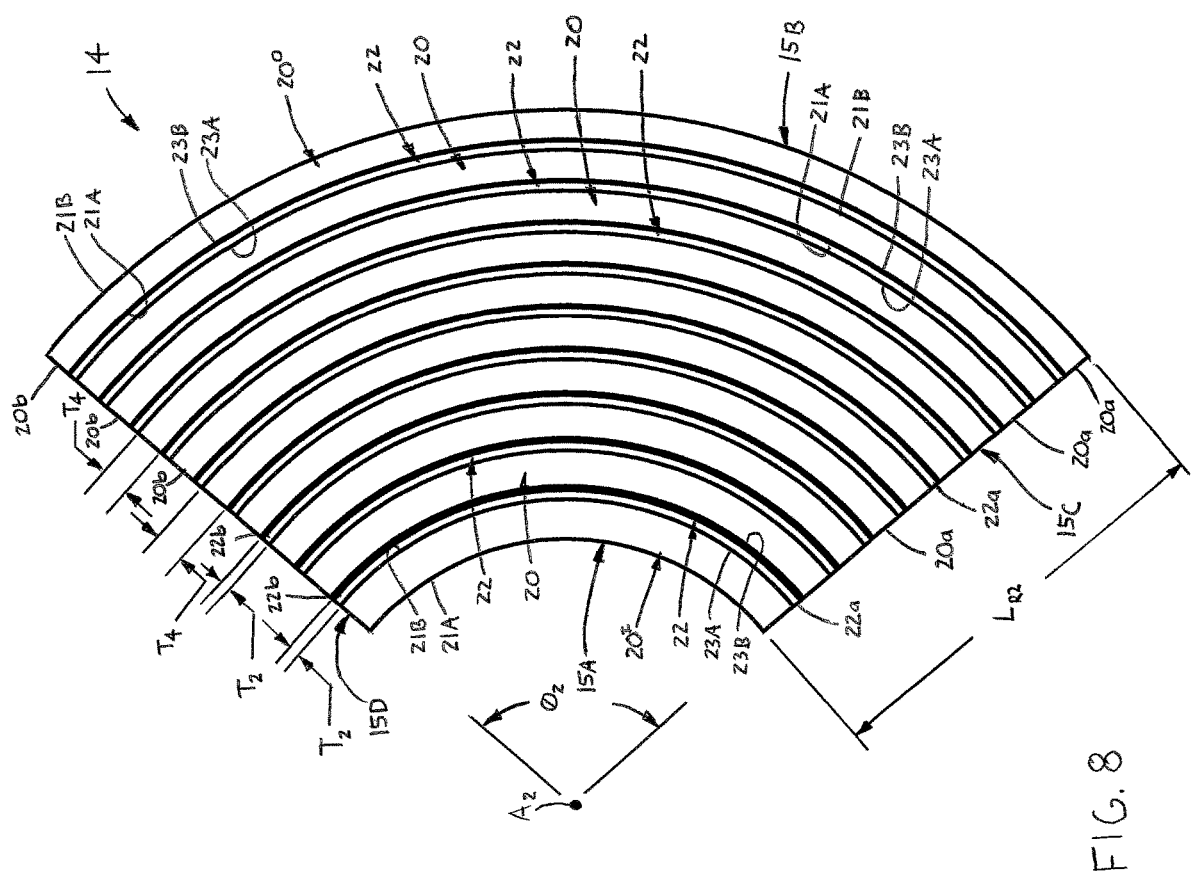
FIG. 8 is a top plan view of a second laminated bearing body.
Figure 9:
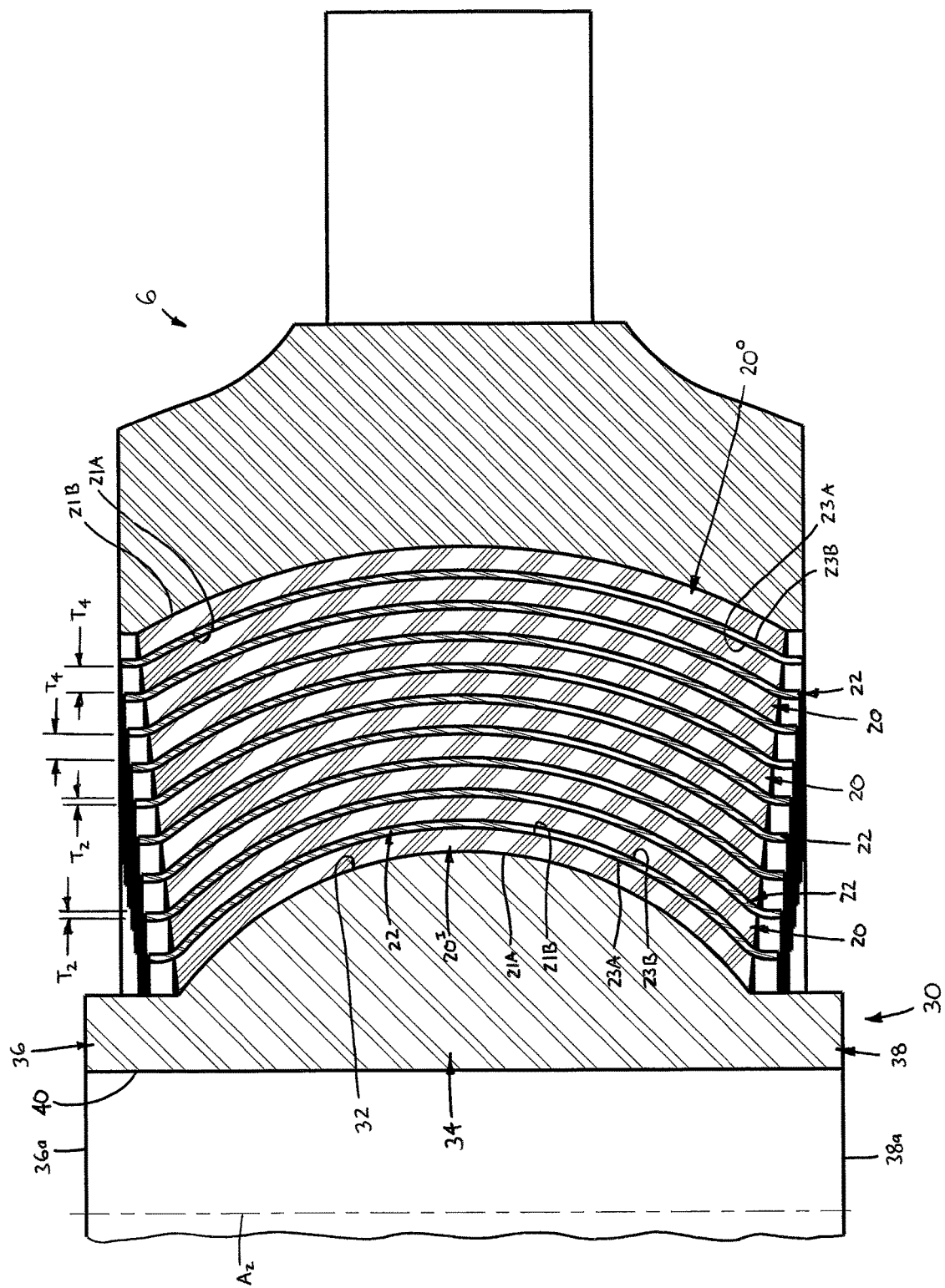
FIG. 9 is an axial cross-sectional view of the second laminated body.

More specifically, the first laminated body 12 has an inner radial end 13A connectable with the first member 1, an outer radial end 13B connectable with the second member 2, a radial length $L_{R1}$ (FIGS. 2 and 6) between the inner and outer ends 13A, 13B and opposing first and second circumferential ends 13C, 13D, respectively. The first laminated body 12 is formed of a plurality of alternating, generally arcuate first elastomeric laminae 16 and generally arcuate first rigid laminae 18 (i.e., "shims") nested, preferably coaxially, generally about a first central axis $A_1$. Each one of the first elastomeric laminae 16 has opposing first and second arcuate ends 16a, 16b, respectively, (FIG. 6) and inner and outer circumferential surfaces 17A, 17B, respectively, (FIGS. 6 and 7) extending circumferentially between the first and second arcuate ends 16a, 16b. Similarly, each first rigid laminae 18 has opposing first and second arcuate ends 18a, 18b, respectively, (FIG. 6) and inner and outer circumferential surfaces 19A, 19B, respectively, (FIGS. 6 and 7) extending circumferentially between the first and second arcuate ends 18a, 18b. Preferably, each one of the first elastomeric laminae 16 and the first rigid laminae 18 is preferably partially spherical as best shown in FIGS. 2, 3 and 7, such that the inner circumferential surface 17A or 19A of each lamina 16, 18 is generally concave and the outer circumferential surface 17B, 19B of each lamina 16, 18 is generally convex. However, the laminae 16, 18 of the first body 12 may alternatively be formed to be substantially cylindrical, generally frustoconical or formed with any other appropriate shape.

Further, each one of the first elastomeric laminae 16 and the first rigid laminae 18 has a circumferential length (not indicated) extending between the first and second arcuate ends 16a, 16b or 18a, 18b of the lamina 16, 18, respectively. The laminae 16, 18 are preferably arranged in the first laminated body 12 such that the circumferential length of each one of the laminae 16, 18 is greater than the circumferential length of all laminae 16, 18 disposed radially inwardly of the one laminae. Furthermore, each first rigid lamina 18 is preferably formed of a metallic material (e.g., low carbon steel), but may be formed of rigid plastic, ceramic, etc., and has a first radial thickness $T_1$ (FIGS. 6 and 7) between the rigid lamina inner and outer surfaces 19A, 19B, which is preferably substantially constant in circumferential directions between the arcuate ends 18a, 18b. The first radial thickness $T_1$ of the first rigid laminae 18 may have about the same first value, e.g., 0.04", 0.06", 0.08", etc., or (preferably) have thicknesses $T_1$ that vary within a range of thickness values, e.g., 0.04"-0.08".

Referring to FIGS. 1-5, 8 and 9, the second laminated body 14 is formed generally similarly to the first body 12 and has an inner radial end 15A connectable with the first member 1, an outer radial end 15B connectable with the second member 2, a radial length $L_{R2}$ (FIGS. 2 and 8) between the inner and outer ends 15A, 15B and opposing first and second circumferential ends 15C, 15D, respectively. The two laminated bodies 12, 14 are preferably formed having at least approximately equal radial extents or lengths, i.e., $L_{R1}=L_{R2}$, but the first laminated body 12 preferably has a substantially larger circumferential or angular extent than the second laminated body 14, as discussed in detail below. As with the first body 12, the second laminated body 14 is preferably formed of a plurality of alternating, generally arcuate second elastomeric laminae 20 and generally arcuate second rigid laminae 22 nested, preferably coaxially, generally about a second central axis $A_2$, which is preferably at least generally collinear with the first central axis $A_1$ when installed in the assembly 10. Preferably, the first and second laminated bodies 12, 14 have the same predetermined number of rigid laminae 18, 22, for example, eight (8) rigid laminae 18 in the first laminated body 12 and eight (8) rigid laminae 22 in the second laminated body 14, and the same number of elastomeric laminae 16, 20, such as nine (9) laminae 16 or 20 in each body 12, 14, respectively.

Further, each one of the second elastomeric laminae 20 has opposing first and second arcuate ends 20a, 20b, respectively, (FIG. 8) and inner and outer circumferential surfaces 21A, 21B, respectively, (FIGS. 8 and 9) extending circumferentially between the first and second arcuate ends 20a, 20b. Likewise, each one of the second rigid laminae 22 has opposing first and second arcuate ends 22a, 22b, respectively, (FIG. 8) and inner and outer circumferential surfaces 23A, 23B, respectively, (FIGS. 8 and 9) extending circumferentially between the first and second arcuate ends 22a, 22b. As with the first laminated body 12, each one of the second elastomeric laminae 20 and the second rigid laminae 22 is preferably partially spherical, such that the inner circumferential surface 21A, 23A of each lamina 20, 22, respectively, is generally concave and the outer circumferential surface 21B, 23B of each lamina 20, 22 is generally convex, but may alternatively be substantially cylindrical, generally frustoconical, etc. Also, each one of the second elastomeric laminae 20 and the second rigid laminae 22 has a circumferential length (not indicated) extending between the first and second arcuate ends 20a, 20b or 22a, 22b of the lamina 20, 22. The laminae 20, 22 are preferably arranged in the second laminated body 14 such that the circumferential length of each one of the laminae 20, 22 is greater than the circumferential length of all laminae 20, 22 disposed radially inwardly of the one laminae, such that the body 14 is generally wedge-shaped.

Furthermore, each second rigid lamina 22 is preferably formed of a metallic material (e.g., low carbon steel), but may be formed of rigid plastic, ceramic, etc., and has a second radial thickness $T_2$ (FIGS. 8 and 9) between the second rigid lamina inner and outer surfaces 23A, which is preferably substantially constant in circumferential directions between the arcuate ends 22a, 22b. Preferably, the second radial thickness $T_2$ of at least a majority, if not all, of the second rigid laminae 22 have the same second value, e.g., about twenty thousandths of an inch (0.02") but may have thicknesses $T_2$ that vary within a range of thickness values.

To provide desired loading characteristics on the bearing assembly 10 as described in detail below, the first radial thickness $T_1$ of each one of at least a majority (or all) of the first rigid laminae 18 is substantially greater than the second radial thickness $T_2$ of each one of at least a majority (or all) of the second rigid laminae 22. As such, the second laminated body 14 has a substantially lesser stiffness than the first laminated body 12. Preferably, the relative sizing of the rigid laminae 18, 22 is such that a ratio of the first radial thickness $T_1$ of each one of the at least a majority of the first rigid laminae 18 to the second radial thickness $T_2$ of each one of the at least a majority of the second rigid laminae 22, i.e., $T_1/T_2$ has a value of at least 2.0 and most preferably at least 3.0 or greater.

Further, each first elastomeric lamina 16 has a third radial thickness $T_3$ (FIGS. 6 and 7) between the first elastomeric lamina inner and outer surfaces 17A, 17B, respectively, and each second elastomeric lamina 20 has a fourth radial thickness $T_4$ (FIGS. 8 and 9) between the second elastomeric lamina inner and outer surfaces 21A, 21B. To enhance the desired stiffness characteristics of the bearing assembly 10 as discussed above, the fourth radial thickness $T_4$ of each one of at least a majority of the second elastomeric laminae 20 is preferably substantially greater than the third radial thickness $T_3$ of each one of at least a majority of the first elastomeric laminae 16. Preferably, the relative sizing of the elastomeric laminae 16, 20 is such that a ratio of the fourth radial thickness $T_4$ of each one of the at least a majority of the second elastomeric laminae 20 to the third radial thickness $T_3$ of each one of the at least a majority of the first elastomeric laminae 16, i.e., $T_4/T_3$ has a value of at least 2.0 and most preferably at least 3.0 or greater.

The benefits of having differing shim thicknesses $T_1$, $T_2$ (and preferably also differing elastomeric laminae thicknesses $T_3$ and $T_4$) between the different laminated bodies 12, 14 is particularly realized in a preferred application of the bearing assembly 10, namely to couple the pin shaft 5 with the connecting rod 6. In this application, the loading on the connecting rod 6 is such that the rod 6 is in tension, which causes loading on the "inboard" portions 10a (FIGS. 1 and 10) of the bearing assembly 10 between the pin shaft 5 and the center $C_R$ (FIG. 10) of the rod 6 to be in tension and the remaining, "outboard" portions 10b (FIGS. 1 and 10) of the bearing assembly 10, i.e., portions not between the shaft 5 and rod center $C_R$ to be in compression. As elastomers have greater compressive strength than tensile strength, increasing the thickness of the elastomeric laminae 20 on the inboard portion 10a of the bearing assembly 10 enables the bearing assembly 10 to support greater loading and have a longer life before failure.

Figure 10:
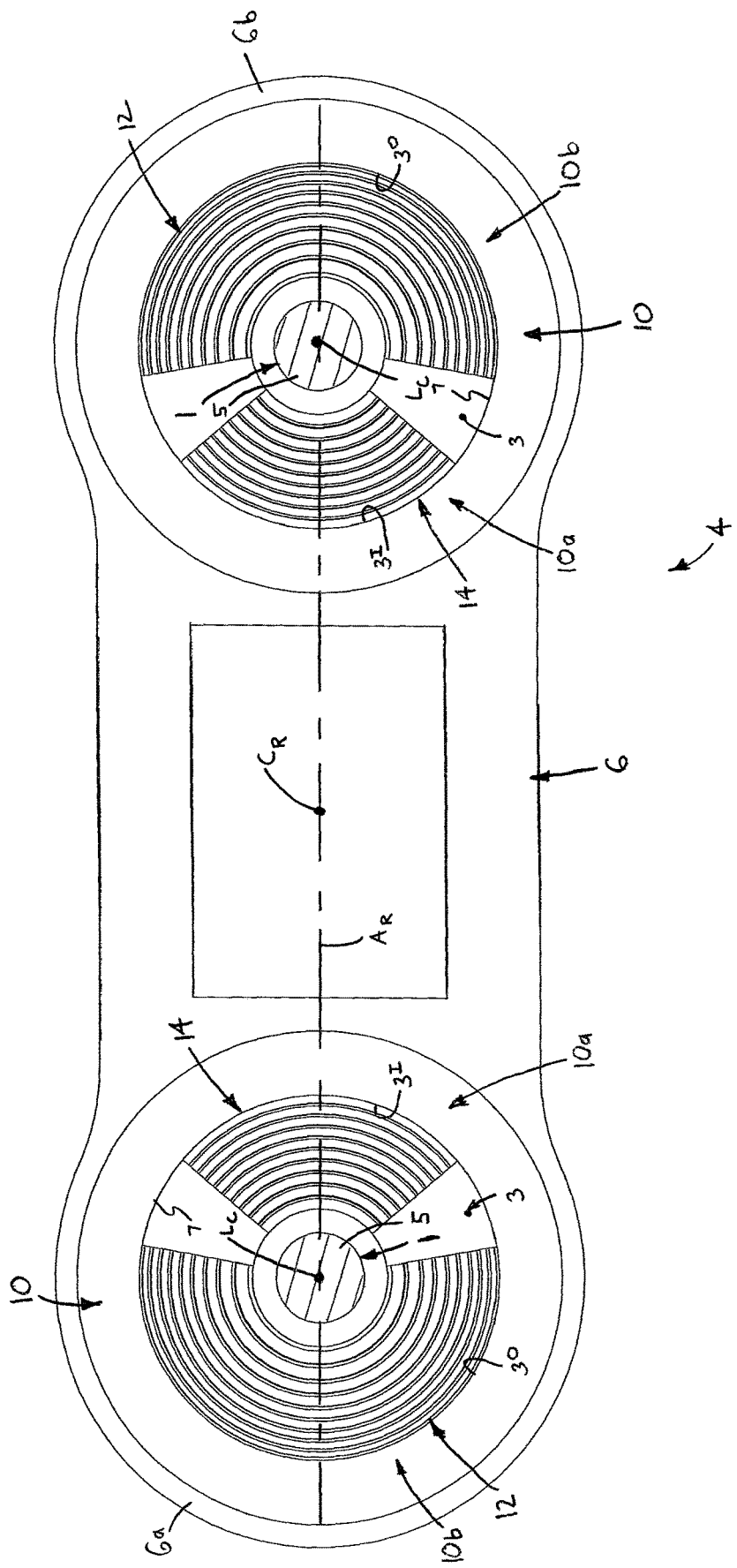
FIG. 10 is a top plan view of an aircraft link having two bearing assemblies of the present invention.

In view of the above, the second laminated body 14 is preferably disposed within an inboard section $3^I$ of the rod bore 3 and the first laminated body 12 is disposed in an outboard section $3^O$ of the rod bore 3, as indicated in FIGS. 1 and 10. The tensile loading is greatest along the rod centerline $A_R$ and the loading on the bearing assembly 10 transitions from tension to compression in either angular direction from the rod centerline $A_R$ and toward the outboard bore section $3^O$ in such a manner that the majority of the bearing assembly 10 is in compression. As such, the two bearing bodies 12, 14 are preferably relatively sized such that the angular size or extent of the first laminated body 12 is substantially larger than the angular size/extent of the second laminated body 14.

More specifically, the first laminated body 12 has a first angle $\theta_1$ (FIG. 6) defined between the first and second circumferential ends 13C, 13D of the body 12, the first angle $\theta_1$ having a value greater than one hundred eighty degrees (180°), and most preferably about two hundred thirty degrees (230°). The second laminated body 14 has a second angle $\theta_2$ (FIG. 8) defined between the first and second circumferential ends 15C, 15D of the body 14, the second first angle $\theta_1$ having a value lesser than one hundred eighty degrees (180°), and most preferably about ninety degrees (90°). With this relative sizing in the preferred application discussed above, the second laminated body 14 is primarily under tensile loading and the first laminated body 12 is primarily under compressive loading.

Referring to FIGS. 3, 5, 7 and 9, the bearing assembly 10 preferably further comprises a central coupler 30 having an outer circumferential surface 32 and being configured to connect each one of the first and second laminated bodies 12, 14 with the first member 1. More specifically, the coupler 30 preferably has a partially spherical central section 34 and first and second cylindrical end sections 36, 38 extending in opposing directions from the central section 34. Preferably, the coupler 30 has a central bore 40 extending between an outer end 36a of the first cylindrical end section 36 and an outer end 38a of the second cylindrical end section 38, the bore 40 being sized to receive at least a portion of the first member 1. Alternatively, the coupler 30 may be substantially solid and have one or both cylindrical ends 36, 38 adapted to connect with the first member 1, as shown in FIG. 3.

Further, the inner end 13A of the first laminated body 12 and the inner end 15A of the second laminated body 14 are each attached to the outer surface 32 of the coupler 30. More specifically, the first laminated body 12 has an innermost first elastomeric lamina $16^I$ providing the first body inner radial end 13A and an outermost elastomeric lamina $16^O$ providing the first body outer radial end 13B. Similarly, the second laminated body 14 has an innermost first elastomeric lamina $20^I$ providing the second body inner radial end 15A and an outermost elastomeric lamina $20^O$ providing the second body outer radial end 15B. With this structure, the innermost elastomeric lamina $16^I$, $20^I$ of each body 12, 14 is bonded to the coupler outer surface 32 and the outermost elastomeric lamina $18^O$, $20^O$ of each body 12, 14 is bonded to an inner circumferential surface 7 (FIGS. 1 and 10) of the second member bore 3, so as to connect the bearing assembly 10 with the two members 1, 2. However, the bearing assembly 10 may be connected to either or both members 1, 2 in any other appropriate means, such as for example, a friction fit between an innermost or/and outermost rigid lamina 18, 22 (structure not shown).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A bearing assembly for movably coupling a first member with a second member, the second member having a bore with a centerline, the bearing assembly comprising:

a first, generally arcuate laminated body disposed within the outer member bore and having an inner radial end connectable with the first member and an outer radial end connectable with the second member, the first laminated body being formed of a plurality of alternating, generally arcuate first elastomeric laminae and generally arcuate first rigid laminae nested generally about a first central axis, each one of the first elastomeric laminae and the first rigid laminae having opposing first and second arcuate ends and inner and outer circumferential surfaces extending circumferentially between the first and second arcuate ends, each first rigid lamina having a first radial thickness between the rigid lamina inner and outer surfaces; and a second, generally arcuate laminated body disposed within the second member bore so as to be spaced circumferentially about the centerline from the first laminated body, the second laminated body having an inner radial end connectable with the first member and an outer radial end connectable with the second member, the second laminated body being formed of a plurality of alternating, generally arcuate second elastomeric laminae and generally arcuate second rigid laminae nested generally about a second central axis, each one of the second elastomeric laminae and the second rigid laminae having opposing first and second arcuate ends and inner and outer circumferential surfaces extending circumferentially between the first and second arcuate ends, each second rigid lamina having a second radial thickness between the rigid lamina inner and outer surfaces;

wherein the first radial thickness of each one of at least a majority of the first rigid laminae is substantially greater than the second radial thickness of each one of at least a majority of the second rigid laminae such that the second laminated body has a substantially lesser stiffness than the first laminated body.

2. The bearing assembly as recited in claim 1 wherein the first laminated body includes a number of the first rigid laminae and the second laminated body includes the number of the second rigid laminae.

3. The bearing assembly as recited in claim 2 wherein the first laminated body has a first body radial length between the first body inner radial end and the first body outer radial end and the second laminated body has a second body radial length between the second body inner end and the second body outer radial end, the first body radial length being substantially equal to the second body radial length.

4. The bearing assembly as recited in claim 1 wherein a ratio of the first radial thickness of each one of the at least a majority of the first rigid laminae to the second radial thickness of each one of the at least a majority of the second rigid laminae has a value of at least 2.0.

5. The bearing assembly as recited in claim 4 wherein the ratio has a value of at least 3.0.

6. The bearing assembly as recited in claim 1 wherein the second radial thickness of each one of the second rigid lamina has about the same second value.

7. The bearing assembly as recited in claim 1 wherein each first elastomeric lamina has a third radial thickness between the first elastomeric lamina inner and outer surfaces and each second elastomeric lamina having a fourth radial thickness between the second elastomeric lamina inner and outer surfaces, the fourth radial thickness of each one of at least a majority of the second elastomeric laminae being substantially greater than the third radial thickness of each one of at least a majority of the first elastomeric laminae.

8. The bearing assembly as recited in claim 7 wherein a ratio of the fourth radial thickness of each one of the at least a majority of the second elastomeric laminae to the third radial thickness of each one of the at least a majority of the first elastomeric laminae has a value of at least 2.0.

9. The bearing assembly as recited in claim 1 wherein:
the first laminated body has opposing first and second circumferential ends and a first angle is defined between the first and second circumferential ends of the first laminated body, the first angle having a value greater than one hundred eighty degrees; and
the second laminated body has opposing first and second circumferential ends and a second angle is defined between the first and second circumferential ends of the second laminated body, the second angle having a value lesser than one hundred eighty degrees.

10. The bearing assembly as recited in claim 1 further comprising a central coupler having an outer circumferential surface and being configured to connect each one of the first and second laminated bodies with the inner member and wherein:
the first laminated body has an innermost first elastomeric lamina providing the first body inner radial end and an outermost elastomeric lamina providing the first body outer radial end, the innermost elastomeric lamina being bonded to the coupler outer surface and the outermost elastomeric lamina being bonded to an inner circumferential surface of the second member;
the second laminated body has an innermost first elastomeric lamina providing the second body inner radial end and an outermost elastomeric lamina providing the second body outer radial end, the second body innermost elastomeric lamina being bonded to the coupler outer surface and the second body outermost elastomeric lamina being bonded to the inner circumferential surface of the second member.

11. The bearing assembly as recited in claim 10 wherein the coupler has a central bore configured to receive a portion of the first member.

12. The bearing assembly as recited in claim 1 wherein each one of the first elastomeric laminae, the first rigid laminae, the second elastomeric laminae and the second rigid laminae is partially spherical such that the inner circumferential surface of each lamina is generally concave and the outer circumferential surface of each lamina is generally convex.

13. The bearing assembly as recited in claim 12 further comprising a central coupler connectable with the first member and having a partially spherical outer circumferential surface, the inner end of the first laminated body and the inner end of the second laminated body each being attached to the outer surface of the coupler.

14. The bearing assembly as recited in claim 1 wherein each one of the first elastomeric laminae, the first rigid laminae, the second elastomeric laminae and the second rigid laminae has a circumferential length extending between the first and second arcuate ends of the lamina, the laminae being arranged in each one of the first and second laminated bodies such that the circumferential length of each one of the laminae is greater than the circumferential length of all laminae disposed radially inwardly of the one laminae.

15. The bearing assembly as recited in claim 1 wherein the first central axis of the first laminated body and the second central axis of the second laminated body are at least generally collinear.

16. The bearing assembly as recited in claim 1 wherein each one of the first and second laminated bodies is configured to deflect when one of the first and second members displaces relative to the other one of the first and second members.

17. A mechanical assembly comprising:
a shaft connectable with a mechanism;
an elongated connecting rod having a longitudinal axis, two opposing ends spaced apart along the axis and at least one bore formed adjacent to one of the two rod ends; and
a bearing assembly for movably coupling the shaft with the rod, the bearing assembly including:

a central coupler disposed within the rod bore and having a central bore, the shaft being at least partially disposed within the coupler bore, and an outer circumferential surface;

a first, generally arcuate laminated body disposed within the outer member bore and having an inner radial end connectable with the first member and an outer radial end connectable with the second member, the first laminated body being formed of a plurality of alternating, generally arcuate first elastomeric laminae and generally arcuate first rigid laminae nested generally about a first central axis, each one of the first elastomeric laminae and the first rigid laminae having opposing first and second arcuate ends and inner and outer circumferential surfaces extending circumferentially between the first and second arcuate ends, each first rigid lamina having a first radial thickness between the rigid lamina inner and outer surfaces; and a second, generally arcuate laminated body disposed within the second member bore so as to be spaced circumferentially about the centerline from the first laminated body, the second laminated body having an inner radial end connectable with the first member and an outer radial end connected with the second member, the second laminated body being formed of a plurality of alternating, generally arcuate second elastomeric laminae and generally arcuate second rigid laminae nested generally about a second central axis, each one of the second elastomeric laminae and the second rigid laminae having opposing first and second arcuate ends and inner and outer circumferential surfaces extending circumferentially between the first and second arcuate ends, each second rigid lamina having a second radial thickness between the rigid lamina inner and outer surfaces;

wherein the first radial thickness of each one of at least a majority of the second rigid laminae is substantially greater than the second radial thickness of each one of at least a majority of the second rigid laminae such that the second laminated body has a substantially lesser stiffness than the first laminated body.

\* \* \* \* \*